US006719504B2

(12) United States Patent
Downey

(10) Patent No.: US 6,719,504 B2
(45) Date of Patent: Apr. 13, 2004

(54) MOTORIZED GROUT-REMOVING DEVICE

(76) Inventor: James Downey, 21 Kiloran Ave., Woodbridge, Ontario (CA), L4L 3S9

( * ) Notice: Subject to any disclaimer, the term of this patent is extended or adjusted under 35 U.S.C. 154(b) by 0 days.

(21) Appl. No.: 09/934,671

(22) Filed: Aug. 23, 2001

(65) Prior Publication Data

US 2002/0051690 A1 May 2, 2002

Related U.S. Application Data

(60) Provisional application No. 60/266,291, filed on Nov. 1, 2000.

(51) Int. Cl.[7] .............................. B23C 3/28; B23C 1/20

(52) U.S. Cl. ........................ 409/182; 409/175; 409/180; 144/136.95; 144/154.5

(58) Field of Search ................................ 409/182, 175, 409/180; 144/136.95, 154.5; 451/344, 345, 346, 347, 348, 349, 350, 351, 352, 353, 354, 355, 356, 357, 358, 359; 264/154

(56) References Cited

U.S. PATENT DOCUMENTS

| | | | | |
|---|---|---|---|---|
| 4,064,588 A | | 12/1977 | Cooper | |
| 4,155,142 A | | 5/1979 | Demetriadis | |
| 4,338,718 A | | 7/1982 | Olkkola | |
| 4,738,571 A | * | 4/1988 | Olson et al. | 409/182 |
| 4,769,201 A | * | 9/1988 | Chiuminatta et al. | 264/154 |
| 5,409,299 A | | 4/1995 | Holder | |
| 5,725,036 A | * | 3/1998 | Walter | 409/182 |
| 5,885,139 A | | 3/1999 | Lemieux et al. | |
| 5,902,080 A | * | 5/1999 | Kopras | 409/182 |
| 6,023,811 A | | 2/2000 | Ciarrocchi | |
| 6,027,289 A | * | 2/2000 | Posh | 409/182 |
| 6,048,260 A | * | 4/2000 | Kopras | 409/182 |
| 6,224,305 B1 | * | 5/2001 | Huggins | 409/182 |

FOREIGN PATENT DOCUMENTS

| | | |
|---|---|---|
| WO | WO 97/48536 | 12/1997 |

* cited by examiner

*Primary Examiner*—Erica Cadugan
*Assistant Examiner*—Dana D Ross
(74) *Attorney, Agent, or Firm*—Sim & McBurney

(57) ABSTRACT

A device for removing grout from between a joint. The device comprises at least one handle member with at least one guide and at least one motor portion. The motor portion has at least one cutting member. The guide and the cutting member are aligned. The guide is adapted to guide the cutting member along the joint.

18 Claims, 5 Drawing Sheets

MOTORIZED GROUT-REMOVING DEVICE

REFERENCE TO RELATED APPLICATIONS

This application claims priority pursuant to 35 USC 119(e) from U.S. Provisional Patent Application No. 60/266,291 dated Nov. 1, 2000.

FIELD OF THE INVENTION

The present invention relates generally to the removal of grout between joints and, in particular, to a motorized grout-removing device for removal of grout between tiles.

In the present invention, the term 'grout' is understood to include mortar or any other similar material used to separate, join or fill-in between joints, joins or interfaces between 'tiles'. The term 'tiles' includes ceramic and/or refractory tiles, building blocks such as bricks, stone blocks, cladding, marble tiles or slabs.

BACKGROUND OF THE INVENTION

Tiles are used widely in construction in a wide variety of locations, including as flooring and walls. For instance, tiles may be used in walls, counters and floors of kitchens, as walls and flooring in bathrooms, as walls and flooring in showers, and in many other locations. In the installation of tiles, grout is placed between the tiles, especially to seal the tiles in place and prevent water, dirt or the like from entering the space between the tiles and causing damage to the structure on which the tiles are located or causing an unacceptable appearance.

In the event that tiles need to be removed after installation e.g. for replacement with new tiles or for repair of damaged tiles, or for other reasons, it is necessary to remove the grout. Removal of grout in the joints between tiles is a tedious process. There are very few devices available commercially for the removal of grout from between tiles, regardless of whether the grout is between ceramic tiles or the like or between building blocks e.g. bricks and stone blocks or the like. Clean-cut grout removal is very difficult to obtain and use of unsuitable devices often results in cracked or broken tiles.

Grout may be removed either by manually cutting or by chiseling the grout. One particular device used in this manner has been described in U.S. Pat. No. 4,338,718. This patent describes a screwdriver-type device whereby the grout-removing portion of the device is a blade. The user operates the device by manually chiseling the grout.

U.S. Pat. No. 4,064,588 describes a grout-cleaning device having an elongated pear-shaped handle, which incorporates a single saw blade within a slot disposed along the narrow edge of the handle. U.S. Pat. No. 6,023,881 describes a similar grout-removal device with multiple saw blades fitted side-by-side within a slot of the narrow edge of the elongated handle. Various saw blades may be used to accommodate various sizes of grout joints.

All of these particular devices require the user to either manually saw or chisel the grout to remove it, both of which are tedious processes.

International Patent Application WO 97/48536 describes a device that removes grout using a laser. The laser is directed onto the grout to remove the grout. The disadvantage of this particular device is that it is quite complicated in design and, thus, costly and difficult to manufacture.

It would be beneficial, therefore, to provide a grout-removal device that is adaptable for use with various sizes of grout joints, affords the user control to avoid or reduce damage to adjacent tiles, and allows the grout to be removed quickly and easily, in a more cost effective manner.

SUMMARY OF THE INVENTION

Accordingly, in one aspect of the present invention, there is provided a device for removing grout from between a joint, the device comprising:

at least one handle member with at least one guide and at least one motor portion, the motor portion having a motor and at least one cutting member;

the guide and the cutting member being aligned;

the guide being adapted to guide the cutting member along the joint.

In a preferred embodiment of the device of the present invention, the guide is a wheel or a guiding edge.

In another embodiment, the guide is an elongate guide such as an elongate guiding edge.

In a further embodiment, the handle member is substantially perpendicular to the guide.

In another embodiment, the device has one or more handle members and one or more motor portions. Preferably, there are two handle members and one motor portion, each handle member having an end connected to the motor portion.

In another embodiment, there is one handle member and two motor portions, the two motor portions being a first motor portion and a second motor portion, the handle member having a first end and a second end, wherein the first end is connected to the first motor portion and the second end is connected to the second motor portion.

In another embodiment, the handle member has an end, wherein the end is connected to the motor portion, the motor portion being angled with respect to the surface such that the guide and the cutting member remain in contact with the joint. Preferably, the motor portion is angled towards the handle member, at an angle of from about 45° to less than about 90° with respect to the surface.

Preferably, the motor portion is a battery operated motor portion or has an electrical power cord. More preferably, the motor portion is a power drill or power tool.

Preferably, the cutting member is selected from the group consisting of a blade, a saw and a side cutting bit. More preferably, the cutting member is selected from the group consisting of a router bit, an end mill, a rasp bit, a circular saw and a reciprocating saw. Most preferably, the cutting member is a router bit.

Preferably, the handle member has an opening for receiving a hand of a user.

Preferably, the handle member is made from a rigid material selected from the group consisting of wood, metal, plastic and medium density fibreboard. More preferably, the handle member is made from plastic.

In another embodiment, the motor portion is connected to the handle member by a flange or a spigot. Preferably, the flange or the spigot has at least one of a vertical adjustment means and an angle adjustment means for adjusting the motor portion. More preferably, the at least one of the vertical adjustment means and the angle adjustment means is a slot.

In another embodiment, the motor portion is moulded into the handle portion.

BRIEF DESCRIPTION OF THE DRAWINGS

Preferred embodiments of the present invention will now be described more fully with reference to the accompanying drawings wherein like numerals denote like parts throughout the several views, and in which.

DETAILED DESCRIPTION OF THE PREFERRED EMBODIMENTS

The present invention is directed to a motorized grout-removal device that is adaptable for use with various sizes of grout-containing joints, especially various widths and depths of grout-containing joints. The device has a motor portion incorporating a cutting member for removal of grout as the device is moved and guided along the joint. In addition, the device has a guide, such as a guiding edge or at least one wheel, for guiding the device along the grout-containing joint and to facilitate maintaining the cutting member of the device within the joint. The cutting member is spaced from the guide.

Figure 1:
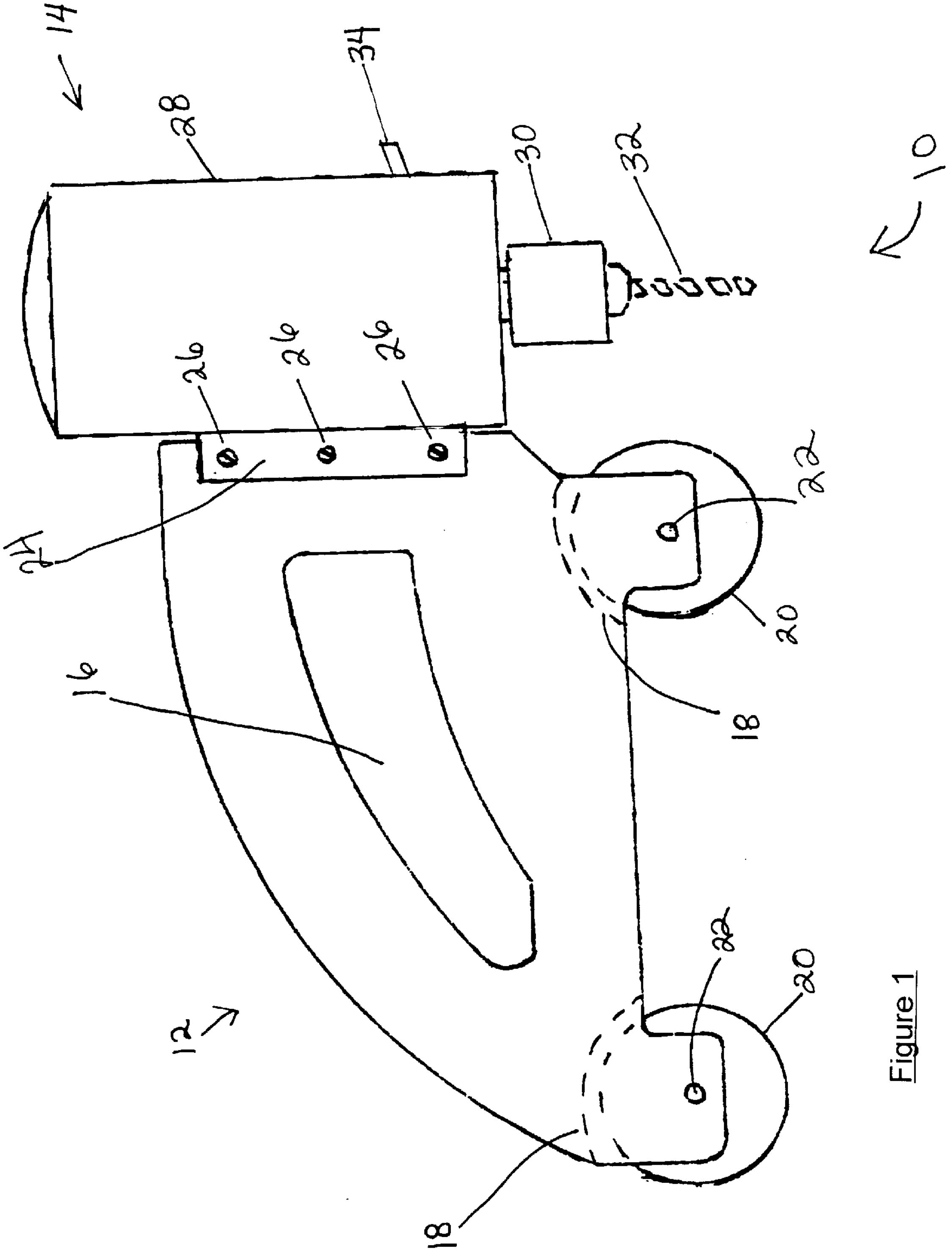
FIG. 1 is a side elevation of a first embodiment of a motorized grout-removing device.

Referring to the drawings and, initially, to FIG. 1, there is illustrated a motorized grout-removing device in accordance with a first embodiment of the present invention. The device is generally indicated by 10. Device 10 comprises handle portion 12 and motor portion 14. Handle portion 12 has opening 16 for receiving the hand of a user. Handle portion 12 also has a pair of wheel wells 18 located on its lower edge, for accommodating wheels 20. Wheels 20 are held in place by axles 22. Wheels 20 are aligned, and may be referred to as in-line wheels.

Motor portion 14 is connected to handle portion 12 by flanges 24 and held in place by a plurality of screws 26. Bolts, rivets or other attachments could be used. Motor portion 14 has motor 28 with drill chuck 30, which in turn receives router bit 32. Router 32 is an example of the cutting member discussed above. Motor portion 14 has switch 34 to activate motor 28. It is understood that wheels 20 and router 32 are aligned.

Figure 2:
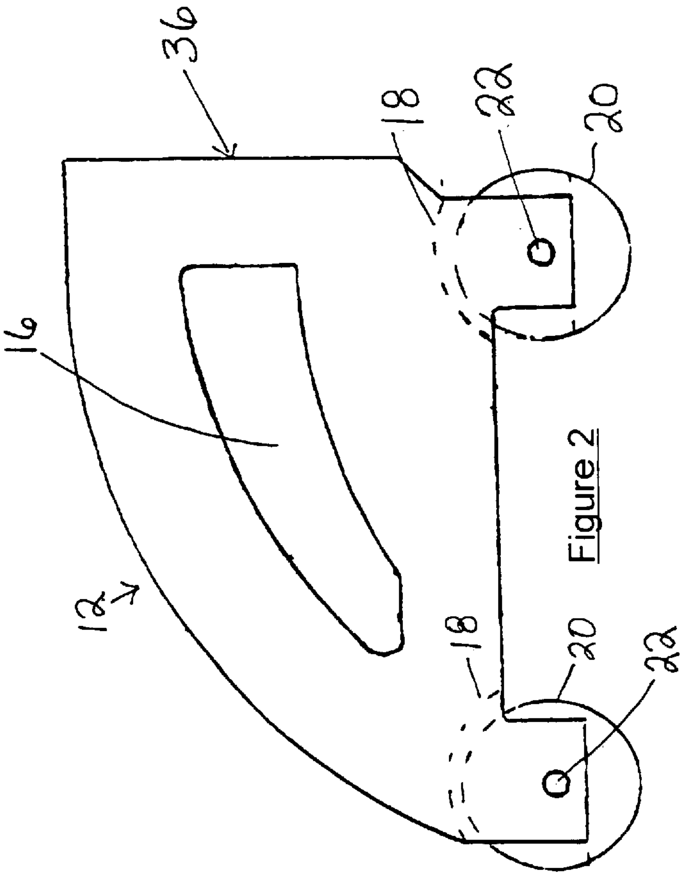
FIG. 2 is a side elevation of a handle portion of the first embodiment.

FIG. 2 shows only handle portion 12 of FIG. 1. Handle portion 12 has opening 16 for receiving the hand of a user. Handle portion 12 also has a pair of wheel wells 18 located on its lower edge, for accommodating wheels 20. Wheels 20 are held in place by axles 22.

Figure 3:
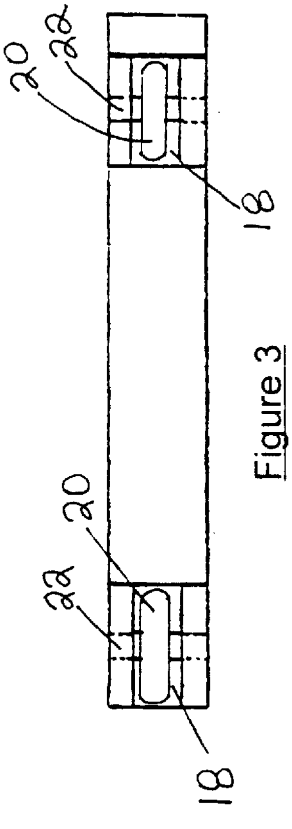
FIG. 3 is a bottom elevation of the handle portion of FIG. 2.

FIG. 3 shows the bottom elevation of handle portion 12. It shows a pair of wheels 20 located within wheel wells 18. Wheels 20 are held in place by axles 22.

Figure 4:
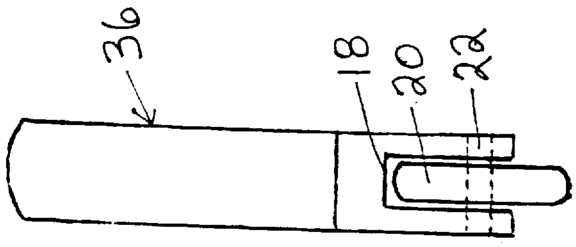
FIG. 4 is an end elevation of the handle of FIG. 2.

FIG. 4 shows a view of end portion 36 of FIG. 2, with wheel 20 located within wheel well 18. Wheel 20 is held in place by axle 22.

Figure 5:
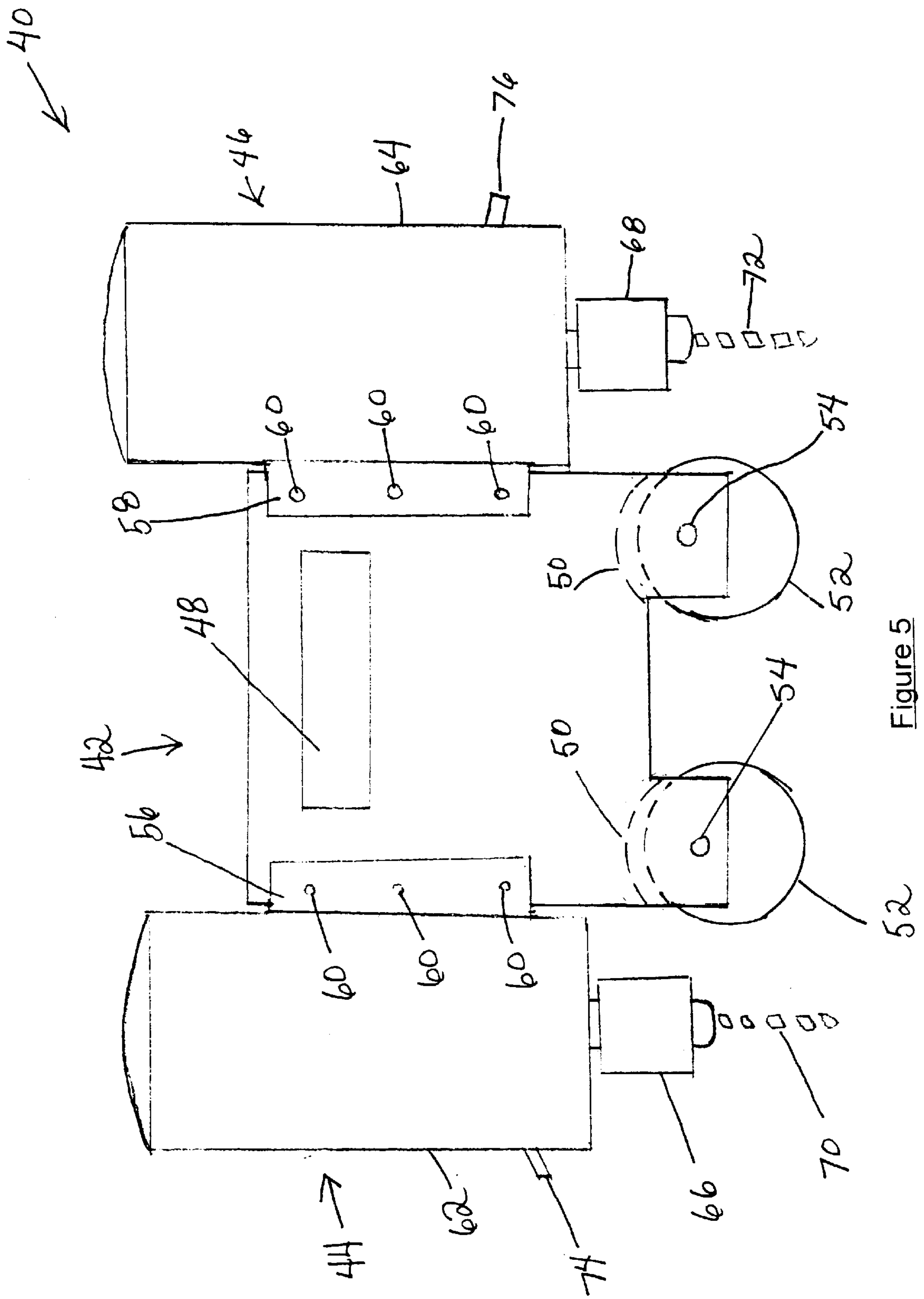
FIG. 5 is a side elevation of a second embodiment of a motorized grout-removing device.

In other embodiments, the device may have a plurality of motor portions. For example, FIG. 5 shows a device 40 with a handle portion 42. Motor portions 44 and 46 are connected to both the front end and back end of handle portion 42, respectively. Handle portion 42 has an opening 48 for receiving the hand of a user. Handle portion 42 also has wheel wells 50 located on its lower edge, for accommodating wheels 52. Wheels 52 are held in place by axles 54. Wheels 52 are aligned, and may be referred to as in-line wheels.

Motor portions 44 and 46 are connected to handle portion 42 by flanges 56 and 58 and held in place by a plurality of screws 60 or other attachment means. Motor portions 44 and 46 have motors 62 and 64, respectively, with drill chucks 66 and 68, which in turn receive router bits 70 and 72, respectively. Each motor portion 44 and 46 has a switch, 74 and 76 respectively, to activate motors 62 and 64. It is understood that wheels 52 and router bits 70 and 72 are aligned.

Figure 6:
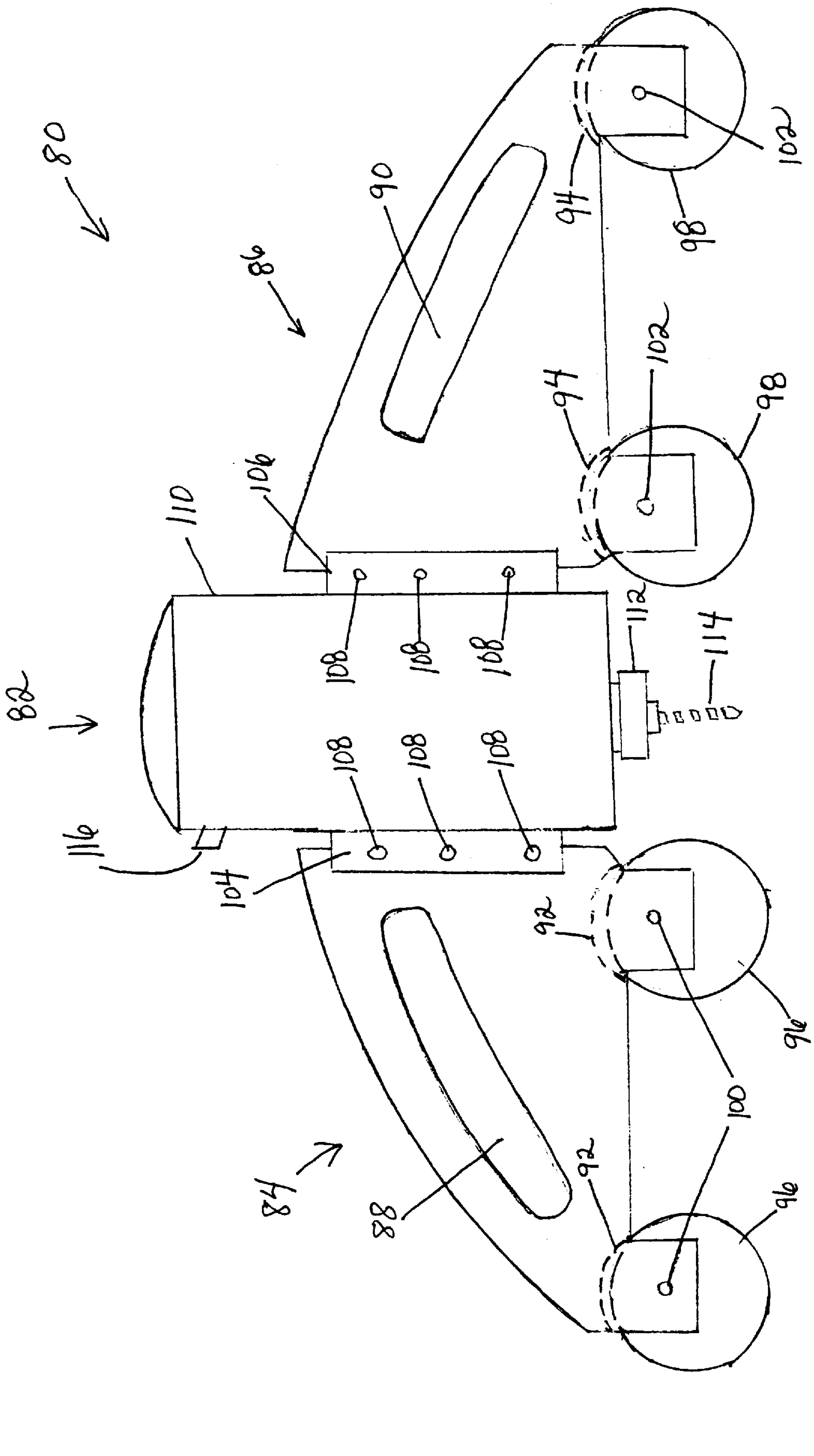
FIG. 6 is a side elevation of a third embodiment of a motorized grout-removing device.

In another embodiment, the device may also have a plurality of handle portions. For example, FIG. 6 shows a device 80 with a motor portion 82 situated between handle portions 84 and 86. Each handle portion, 84 and 86, has an opening 88 and 90, respectively, for receiving the hands of a user. Handle portion 84 and 86 also have wheel wells 92 and 94, respectively, located on its lower edge, for accommodating wheels 96 and 98. Wheels 96 and 98 are held in place by axles 100 and 102, respectively. Wheels 96 and 98 are aligned, and may be referred to as in-line wheels.

Motor portion 82 is connected to handle portions 84 and 86 by flanges 104 and 106, respectively and held in place by a plurality of screws 108 or other attachment means. Motor portion 82 has a motor 110 with a drill chuck 112, which in turn receives router bit 114. Motor portion 82 has a switch 116 to activate motor 110. It is understood that wheels 96 and 98 and router bit 114 are aligned.

Although the embodiment of FIG. 6 shows each handle having two wheels, it is understood that one or both handles could have only one wheel. Additional wheels could be added to one or both handles.

Figure 7:
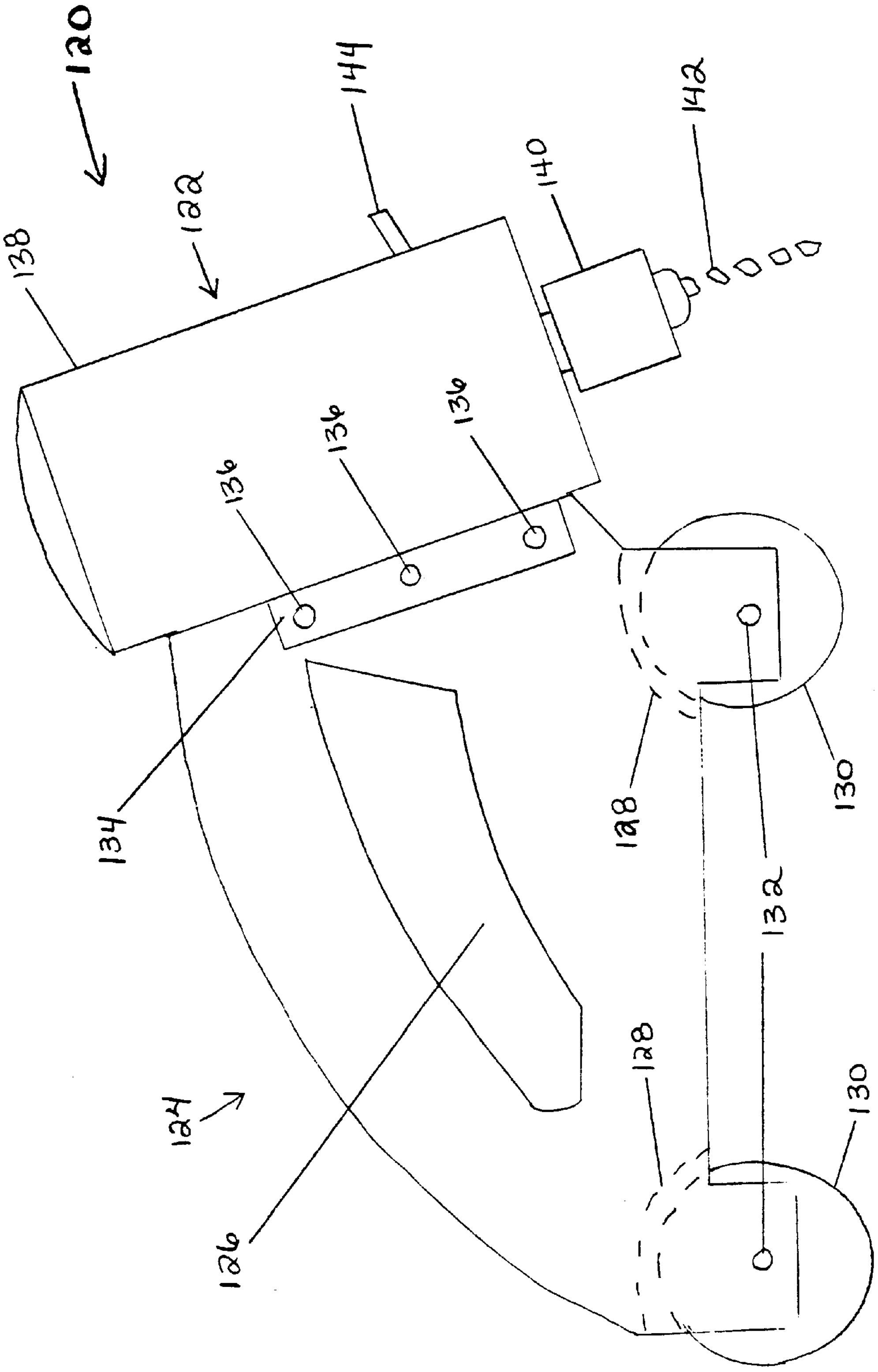
FIG. 7 is a side elevation of a fourth embodiment of a motorized grout-removing device.

In other embodiments, the device may have an angled motor portion. For example, FIG. 7 shows a device 120 with a motor portion 122 connected to a handle portion 124 at an angle. Handle portion 124 has an opening 126 for receiving the hand of a user. Handle portion 124 also has wheel wells 128 located on its lower edge, for accommodating wheels 130. Wheels 130 are held in place by axles 132. Wheels 130 are aligned, and may be referred to as in-line wheels.

Motor portion 122 is connected to handle portion 124 by a flange 134 and held in place by a plurality of screws 136 or other attachment means. Motor portion 122 has a motor 138 with a drill chuck 140, which in turn receives a router bit 142. Motor portion 122 has a switch 144 to activate motor 138. It is understood that wheels 130 and router bit 142 are aligned with one another in such a way that wheels 130 and router bit 142 remain in contact with the grout-containing joint.

In this embodiment, motor portion 122 is usually in the plane formed by handle portion 124 but with motor 138 and router bit 142 not perpendicular to the surface containing the joint, especially with motor portion 122 being angled towards handle portion 124. Preferably, motor portion 122 is less than about 90° with respect to the surface. More preferably, the angle is in a range of from about 45° to less than about 90° with respect to the surface.

Further embodiments may have the guide and the cutting member aligned, with the handle portion at right angles to the guide.

The handle portion of the device may be made from any material such as plastic, medium density fibreboard, metal or wood, as long as the material is rigid enough to withstand use of the device for grout removal. Preferably handle portion 12 is made from plastic. The handle portion may be any shape or size provided that the handle portion may accommodate the guide and motor portion, and be readily gripped by a user. Ergonomic designs may be used, and are preferred.

The motor portion may be any motorized device, preferably battery operated or having an electrical connection. More preferably, the motor portion is a power drill or power tool.

The motor portion is connected to the handle portion. In preferred embodiments, the motor portion is connected to the handle portion by a flange or a spigot. The motor portion may be moulded into the handle portion.

The cutting member may be any type of blade, saw, or side cutting bit, and in preferred embodiments, the cutting member may be a router bit, an end mill, a rasp bit, a circular saw or a reciprocating saw. Various sizes of cutting members e.g. router bits, may be used, especially to fit the width and depth of the joint. The cutting member may also be adjusted in such a manner as to decrease or increase its depth. For example, the router bit may be adjusted within the drill chuck to expose a certain and desired length of the router bit.

In another embodiment, the connection of the motor portion to the handle portion could be adjusted in such a way as to raise or lower the motor portion relative to the handle portion such that the cutting member would increase or decrease its depth of penetration within the joint. This could be achieved using slots within the flange attaching the motor portion to the handle portion with screws and butterfly nuts. Other means of vertical adjustment may be used.

In another embodiment, the connection of the motor portion to the handle portion could be adjusted in such a way as to angle the motor portion relative to the handle portion such that the motor and cutting member are not perpendicular to the surface containing the joint. This could be achieved using slots within the flange attaching the motor portion to the handle portion with screws and butterfly nuts. Other means of angle adjustment may be used.

In another embodiment, the connection of the motor portion to the handle portion could be adjusted in such a way as to angle the motor portion relative to the handle portion such that the motor and cutting member are not perpendicular to the surface containing the joint and raise or lower the motor portion relative to the handle portion such that the cutting member would increase or decrease its depth of penetration within the joint.

The cutting member may be attached to the motor of the motor portion by a clamping member. The clamping member is preferably a drill chuck.

As illustrated in the above embodiments, the guide may be a plurality of wheels. There are a variety of different types of guides that could be used, for instance, a guiding edge. The guide may be one wheel only. The guide may also be an elongate guide such as an elongate guiding edge. The guide is preferably adaptable to various widths of the joints, and more preferably, the guide fits the approximate width and depth of the grout-containing joint, allowing the guide to move with ease along the joint.

Devices 10, 40, 80 and 120 of the first, second, third and fourth embodiments all operate in a similar manner. Device 10 is initiated by activating switch 34, which initiates motor portion 14. Wheels 20 are aligned in the joints of the tiles and, using handle portion 12, device 10 is pushed or pulled along the joint allowing router bit 32 to cut through the grout. Router bit 32 is set to the required depth.

These devices are adaptable for use with various sizes of grout joints, afford the user control to reduce or avoid damage to adjacent tiles, and allow the grout to be removed quickly and easily, in a more cost-effective manner.

I claim:

1. A device for removing grout from between a joint between adjacent tiles on a planar surface, said device comprising:

a planar at least one handle member having a forward end and a rearward end and a motor portion connected to said rearward end of the handle member, said handle member having an opening therethrough for receiving a hand of a user, said motor portion having a motor and at least one cutting member;

a first guide in the form of a wheel mounted adjacent the forward end of said handle member and a second guide in the form of a wheel mounted adjacent the rearward end of said handle member, said guides being in planar alignment with said handle member, said guide and said cutting member being axially aligned for axial alignment thereof with said grout;

said guides guiding said cutting member along said joint while engaging tiles on said planar surface.

2. A device according to claim 1, wherein there is one handle member and one motor portion.

3. A device according to claim 2, wherein said handle member has an end connected to said motor portion, said motor portion being angled with respect to the joint such that said guide and said cutting member remain in contact with the joint.

4. A device according to claim 1 wherein said motor portion is angled towards said handle member at an angle of from about 45° to less than 90°.

5. A device according to claim 1, wherein said motor portion is a battery operated motor portion.

6. A device according to claim 1, wherein said motor portion has an electrical power cord.

7. A device according to claim 1, wherein said motor portion is a power drill or power tool.

8. A device according to claim 1, wherein said cutting member is selected from the group consisting of a blade, a saw and a side cutting bit.

9. A device according to claim 1, wherein said cutting member is selected from the group consisting of a router bit, an end mill, a rasp bit, a circular saw or a reciprocating saw.

10. A device according to claim 9, wherein said cutting member is said router bit.

11. A device according to claim 1, wherein said handle member is made from a rigid material selected from the group consisting of wood, metal, plastic and medium density fibreboard.

12. A device according to claim 11, wherein said handle member is made from plastic.

13. A device according to claim 1, wherein said motor portion is connected to said handle member by a flange or a spigot.

14. A device according to claim 13, wherein said flange or said spigot has at least one of a vertical adjustment means and an angle adjustment means for adjusting said motor portion.

15. A device according to claim 14, wherein said at least one of said vertical adjustment means and said angle adjustment means is a slot.

16. A device according to claim 1, wherein said motor portion is moulded into the handle portion.

17. A device for removing grout from a joint, said device comprising:

two planar handle members, each having a forward end and a rearward end, and one motor portion connected to said rearward end of each handle member, each said handle member having an opening therethrough for receiving a hand of a user, said motor portion having a motor and at least one cutting member, and wheels mounted adjacent the forward end of each of said handle members and wheels mounted adjacent the rearward end of each of said handle members, said wheels being in planar alignment with said handle members said wheels and said cutting member being axially aligned to axial alignment thereof with the grout, said wheels guiding said cutting member along said joint.

18. A device for removing grout from a joint, said device comprising:

one planar handle member and two motor portions, said two motor portions being a first motor portion and a second motor portion, said handle member having a forward end and a rearward end, wherein said forward end is connected to said first motor portion and said rearward end is connected to said second motor portion, said handle member having an opening therethrough for receiving a hand of a user, each said motor portion having a motor and at least one cutting member, a wheel mounted adjacent the forward end of the handle member and a wheel mounted adjacent the rearward end of the handle member said wheels being in planar alignment with said handle member, said wheels and said cutting member being axially aligned for axial alignment thereof with said grout, said wheels guiding said cutting member along said joint.

* * * * *